United States Patent
Hu et al.

(10) Patent No.: US 12,507,236 B2
(45) Date of Patent: Dec. 23, 2025

(54) WIRELESS COMMUNICATION METHOD AND TERMINAL DEVICE

(71) Applicant: GUANGDONG OPPO MOBILE TELECOMMUNICATIONS CORP., LTD., Guangdong (CN)

(72) Inventors: Yi Hu, Guangdong (CN); Haitao Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 439 days.

(21) Appl. No.: 18/090,895

(22) Filed: Dec. 29, 2022

(65) Prior Publication Data

US 2023/0239875 A1 Jul. 27, 2023

Related U.S. Application Data

(63) Continuation of application No. PCT/CN2020/121551, filed on Oct. 16, 2020.

(51) Int. Cl.
*H04W 72/1273* (2023.01)
*H04W 24/10* (2009.01)

(52) U.S. Cl.
CPC ....... *H04W 72/1273* (2013.01); *H04W 24/10* (2013.01)

(58) Field of Classification Search
CPC .......................... H04W 72/1273; H04W 24/10
See application file for complete search history.

(56) References Cited

U.S. PATENT DOCUMENTS

| 2018/0159668 A1* | 6/2018 | Phuyal | H04L 1/1861 |
| 2018/0206232 A1* | 7/2018 | Takeda | H04L 1/1864 |
| 2018/0368175 A1 | 12/2018 | Jeon et al. | |
| 2019/0199503 A1 | 6/2019 | Son | |
| 2019/0260425 A1* | 8/2019 | Ji | H04L 5/0091 |
| 2020/0313833 A1 | 10/2020 | Yi et al. | |

FOREIGN PATENT DOCUMENTS

| CN | 1921406 B | 10/2010 | |
| CN | 110192408 A * | 8/2019 | ........ H04W 52/0235 |
| CN | 110401963 A | 11/2019 | |
| CN | 110636642 A | 12/2019 | |
| CN | 111225450 A | 6/2020 | |

(Continued)

OTHER PUBLICATIONS

Extended European Search Report for EP Application 20957229.6 mailed Nov. 9, 2023. (12 pages).

(Continued)

*Primary Examiner* — Samina F Choudhry
(74) *Attorney, Agent, or Firm* — Young Basile Hanlon & MacFarlane, P.C.

(57) ABSTRACT

A wireless communication method and a terminal device, the method including the following. A terminal device receives a media access control (MAC) control element (CE) transmitted from a network device, where the MAC CE indicates a first downlink configuration. The terminal device determines an effective time of the first downlink configuration and/or an effective time of the MAC CE according to a signal transmission RTT between the terminal device and the network device.

18 Claims, 6 Drawing Sheets

(56) References Cited

FOREIGN PATENT DOCUMENTS

| CN | 111526576 A | | 8/2020 | |
|---|---|---|---|---|
| CN | 112398516 A | * | 2/2021 | |
| TW | 202127948 A | * | 7/2021 | ........... H04L 1/1812 |
| WO | WO-2022064234 A1 | * | 3/2022 | |

OTHER PUBLICATIONS

OPPO, Discussion on timing relationship enhancement, 3GPP TSG RAN WG1 #102, R1-2006029, Aug. 17-28, 2020. (3 pages).

CATT, Physical layer control procedure enhancement, 3GPP TSG RAN WG1 Meeting #98bis, R1-1910337, Oct. 14-20, 2019. (5 pages).

Ericsson, Reduced latency Scell management for NR CA, 3GPP TSG-RAN WG1 #98, R1-1909144, Aug. 26-30, 2019. (7 pages).

MediaTek Inc., Efficient and Low Latency Serving Cell Access Switching, Efficient and Low Latency Serving Cell Access Switching, R1-1904491, Apr. 4-8, 2019. (6 pages).

Asia Pacific Telecom, Discussion on physical layer control procedures for NTN, 3GPP TSG-RAN WG1 Meeting #99, R1-1912246, Nov. 18-22, 2019. (3 pages).

RP-192504, 3GPP TR 38.821 V1.0.0 (Dec. 2019), 3rd Generation Partnership Project; Technical Specification Group Radio Access Network; Solutions for NR to support non-terrestrial networks (NTN) (Release 16). Retrieved from: https://www.3gpp.org/ftp/TSG_RAN/TSG_RAN/TSGR_86/Docs/RP-192504.zip.

WIPO, International Search Report and Written Opinion for International Application No. PCT/CN2020/121551, Jun. 24, 2021.

* cited by examiner

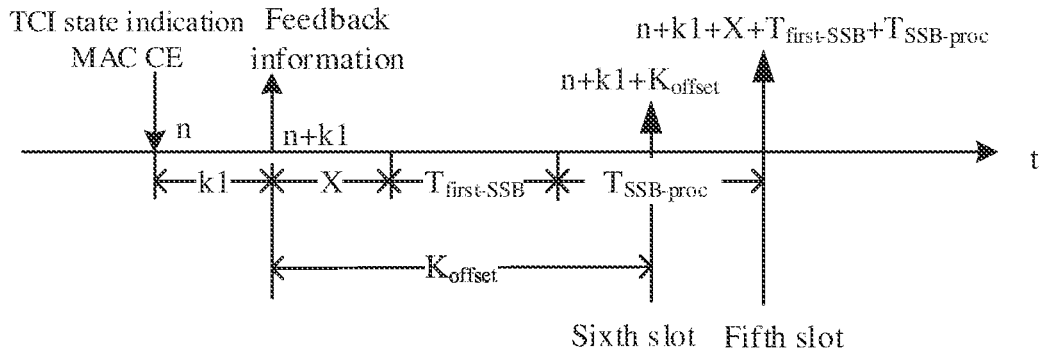
FIG. 9
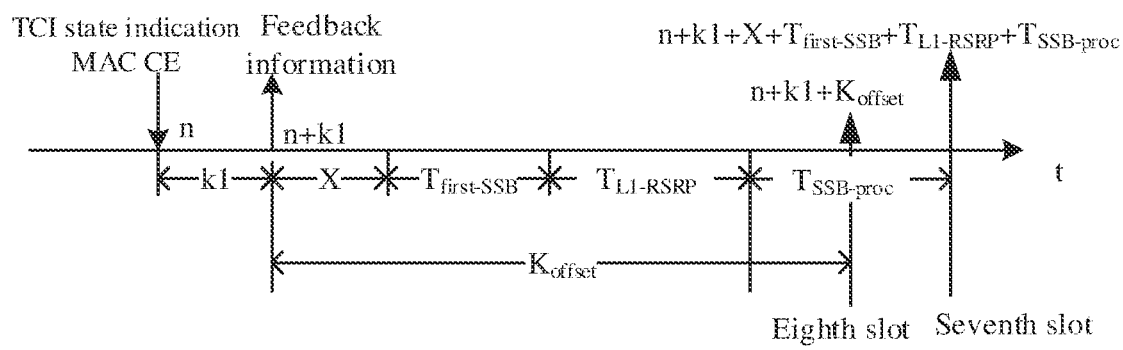
FIG. 10
300
A terminal device receives a radio resource control (RRC) message transmitted from a network device — S310
The terminal device determines an RRC procedure processing delay corresponding to the RRC message according a signal transmission RTT between the terminal device and the network device — S320
FIG. 11

WIRELESS COMMUNICATION METHOD AND TERMINAL DEVICE

CROSS-REFERENCE TO RELATED APPLICATION(S)

This application is a continuation of International Application No. PCT/CN2020/121551, filed Oct. 16, 2020, the entire disclosure of which is hereby incorporated by reference.

TECHNICAL FIELD

Implementations of this disclosure relate to the field of communication, and in particular to a wireless communication method and a terminal device.

BACKGROUND

Network devices may perform downlink configuration through media access control (MAC) control element (CE) or radio resource control (RRC) messages. For an effective time of the downlink configuration or an RRC procedure processing delay of RRC messages, a processing delay of the terminal is mainly considered, which is usually a few milliseconds.

In a non-terrestrial network (NTN) system, a distance between a terminal and a satellite is relatively large. If only the processing delay of the terminal is considered, a network device may not be able to use an updated downlink configuration before the network device receives feedback information from the terminal device for the MAC CE or RRC message, which leads to inconsistent understanding between a terminal side and a network side.

SUMMARY

In a first aspect, a wireless communication method is provided. The method includes the following. A terminal device receives a media access control (MAC) control element (CE) transmitted from a network device, where the MAC CE indicates a first downlink configuration. The terminal device determines an effective time of the first downlink configuration and/or an effective time of the MAC CE according to a signal transmission RTT between the terminal device and the network device.

In a second aspect, a wireless communication method is provided. The method includes the following. A terminal device receives a radio resource control (RRC) message transmitted from a network device. The terminal device determines an RRC procedure processing delay corresponding to the RRC message according to a signal transmission RTT between the terminal device and the network device.

In a third aspect, a terminal device is provided. The terminal device includes a processor and a memory. The memory is configured to store a computer program. The processor is configured to invoke and execute the computer program stored in the memory to perform the method of the first aspect or any implementation thereof.

BRIEF DESCRIPTION OF THE DRAWINGS

FIG. 9 is a schematic diagram illustrating an activation effective time of a TCI state when a MAC CE indicates activating the TCI state.

FIG. 10 is another schematic diagram illustrating an activation effective time of a TCI state when a MAC CE indicates activating the TCI state.

FIG. 11 is a schematic diagram of another wireless communication method provided in implementations of the disclosure.

DETAILED DESCRIPTION

Figure 1:
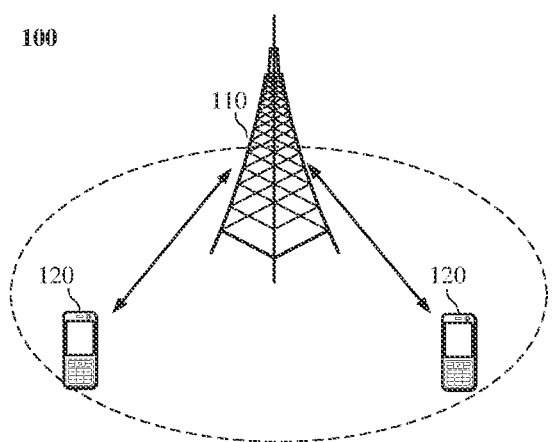
FIG. 1 to FIG. 3 are schematic diagrams illustrating scenarios to which implementations of the disclosure are applicable.

The following will describe technical solutions in implementations of the disclosure with reference to the accompanying drawings in implementations of the disclosure. Apparently, implementations described herein are merely some rather than all implementations of the disclosure. Based on the implementations of the disclosure, all other implementations obtained by those of ordinary skill in the art without creative effort shall fall within the protection scope of the disclosure.

The technical solutions in implementations of the disclosure are applicable to various communication systems, for example, a global system of mobile communication (GSM), a code division multiple access (CDMA) system, a wideband code division multiple access (WCDMA) system, a general packet radio service (GPRS), a long term evolution (LIE) system, an advanced LTE (LTE-A) system, a new radio (NR) system, an evolved system of an NR system, an LTE-based access to unlicensed spectrum (LTE-U) system, an NR-based access to unlicensed spectrum (NR-U) system, a non-terrestrial networks (NTN) system, a universal mobile telecommunication system (UMTS), a wireless local area network (WLAN), a wireless fidelity (Wi-Fi), a 5th-generation (5G) system, or other communication systems.

Generally, a traditional communication system supports a limited number of connections, which are also easy to implement. However, with development of communication technologies, a mobile communication system will not only support traditional communication but also support, for example, device-to-device (D2)) communication, machine-to-machine (M2M) communication, machine-type communication (MTC), vehicle-to-vehicle (V2V) communication, vehicle to everything (V2X) communication, etc. The implementations of the disclosure may also be applied to these communication systems.

Optionally, a communication system in implementations of the disclosure may be applied to a carrier aggregation (CA) scenario, a dual connectivity (DC) scenario, or a standalone (SA) network deployment scenario.

Optionally, the communication system in implementations of the disclosure may be applied to an unlicensed spectrum scenario, where the unlicensed spectrum may also be considered as a shared spectrum. Alternatively, the communication system in implementations of the disclosure may also be applied to a licensed spectrum scenario, where the licensed spectrum may also be considered as an unshared spectrum.

Optionally, implementations of the disclosure may be applied to the NTN system or a terrestrial network (TN) system.

Various implementations of the disclosure are described in connection with a terminal device and a network device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, a user device, etc.

The terminal device may be a station (ST) in a WLAN, a cellular radio telephone, a cordless telephone, a session initiation protocol (SIP) telephone, a wireless local loop (WLL) station, a personal digital assistant (PDA) device, a handheld device with wireless communication functions, a computing device, other processing devices coupled with a wireless modem, an in-vehicle device, a wearable device, a terminal device in a next generation communication system, for example, an NR network, a terminal device in a future evolved public land mobile network (PLMN), etc.

In implementations of the disclosure, the terminal device may be deployed on land, for example, deployed indoors or outdoors, or may be handheld, wearable, or vehicle-mounted. The terminal device may also be deployed on water, for example, on a ship, etc. The terminal device may also be deployed in the air, for example, on an airplane, an air balloon, a satellite, etc.

In implementations of the disclosure, the terminal device may be a mobile phone, a pad, a computer with a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in a smart city, a wireless terminal device in smart home, etc. The terminal device involved in the implementations of the disclosure may also be referred to as terminal, user equipment (UE), access terminal equipment, vehicle-mounted terminal, industrial control terminal, UE unit, UE station, mobile station, mobile station, remote station, remote terminal equipment, mobile equipment, UE terminal equipment, wireless communication equipment, UE agent or UE device, etc. The terminal device may also be fixed or mobile.

By way of explanation rather than limitation, in implementations of the disclosure, the terminal device may also be a wearable device. The wearable device may also be called a wearable smart device, which is a generic term of wearable devices obtained through intelligent design and development on daily wearing products with wearable technology, for example, glasses, gloves, watches, clothes, accessories, shoes, etc. The wearable device is a portable device that nay be directly worn or integrated into clothes or accessories of a user. In addition to being a hardware device, the wearable device can also implement various functions through software support, data interaction, and cloud interaction. A wearable smart device in a broad sense includes, for example, a smart watch or smart glasses with complete functions and large sizes and capable of implementing independently all or part of functions without depending on a smart phone, and for example, various types of smart bands and smart jewelries for physical monitoring, each of which is dedicated to application functions of a certain type and required to be used together with other devices such as a smart phone.

In implementations of the disclosure, the network device may be a device for communicating with mobile devices, and the network device may be an access point (AP) in a WLAN, a base transceiver station (BTS) in a GSM or a CDMA, may also be a Node B (NB) in a WCDMA, and may also be an evolutional Node B (eNB or eNodeB) in a LTE, or a relay station or an AP, or an in-vehicle device, a wearable device, a network device or g-Node B (gNB) in an NR network, a network device in a future evolved PLMN, etc.

By way of explanation rather than limitation, in implementations of the disclosure, the network device may be movable, for example, the network device may be a mobile device. Optionally, the network device may be a satellite or a balloon station. For example, the satellite may be a low earth orbit (LEO) satellite, a medium earth orbit (MEO) satellite, a geosynchronous earth orbit (GEO) satellite, a high elliptical orbit (HEO) satellite, etc. Optionally, the network device may also be a base station disposed on land, water or other places.

In implementations of the disclosure, the network device can provide services for a cell, and the terminal device communicates with the network device through transmission resources (e.g., frequency-domain resources, or spectrum resources) used by the cell. The cell may be a cell corresponding to the network device (e.g., a base station). The cell may correspond to a macro base station, or may correspond to a base station corresponding to a small cell. The small cell may include a metro cell, a micro cell, a pico cell, a femto cell, and the like. These small cells are characterized by small coverage and low transmission power and are applicable to provide data transmission service with high-rate.

Exemplarily, FIG. 1 is a schematic architectural diagram of a communication system provided in implementations of the disclosure. As illustrated in FIG. 1, the communication system 100 may include a network device 110. The network device 110 may be a device that can communicate with a terminal device 120 (also referred to as "communication terminal" or "terminal"). The network device 110 can provide a communication coverage for a specific geographical area and communicate with terminal devices in the coverage area.

FIG. 1 exemplarily illustrates one network device and two terminal devices. Optionally, the communication system 100 may include multiple network devices, and there may be other numbers of terminal devices within coverage of each of the network devices. Implementations of the disclosure are not limited thereto.

Figure 2:
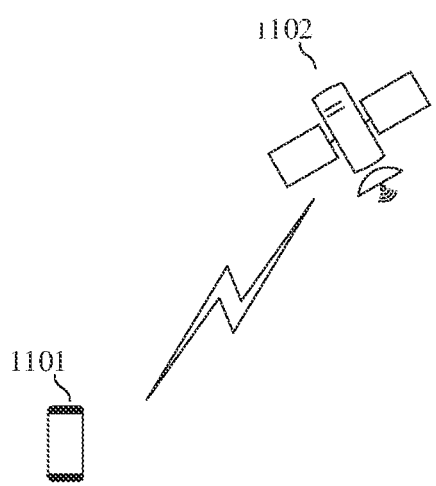

Exemplarily, FIG. 2 is a schematic architectural diagram of another communication system provided in implementations of the disclosure. Referring to FIG. 2, a terminal device 1101 and a satellite 1102 are provided, and wireless communication can be performed between the terminal device 1101 and the satellite 1102. A network formed by the terminal device 1101 and the satellite 1102 may also be referred to as NTN. In the communication system architecture illustrated in FIG. 2, the satellite 1102 may function as a base station, and the terminal device 1101 and the satellite 1102 may communicate directly. Under the system architecture, the satellite 1102 may be referred to as a network device. Optionally, the communication system may include multiple network devices 1102, and other numbers of terminal devices may be included within the coverage of each network device 1102, which is not limited in implementations of the disclosure.

Figure 3:
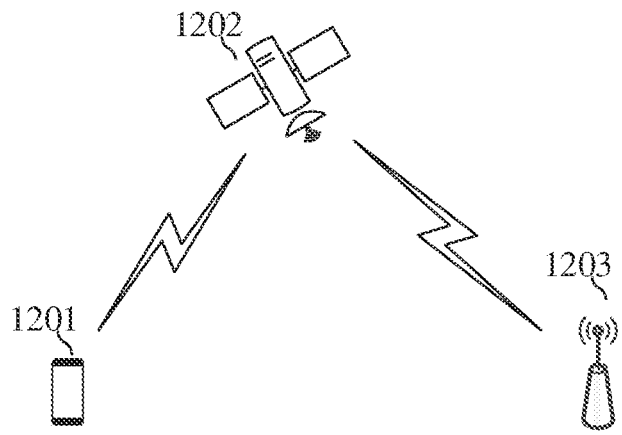

Exemplarily, FIG. 3 is a schematic structural diagram of another communication system provided in implementations of the disclosure. Referring to FIG. 3, a terminal device 1201, a satellite 1202, and a base station 1203 are provided, and wireless communication may be performed between the terminal device 1201 and the satellite 1202, and communication may be performed between the satellite 1202 and the base station 1203. The network formed by the terminal device 1201, the satellite 1202, and the base station 1203 may also be referred to as NTN. In the communication system architecture illustrated in FIG. 3, the satellite 1202 may not have the function of a base station, and the communication between the terminal device 1201 and the base station 1203 needs to be relayed through the satellite 1202. In this system architecture, the base station 1203 may be called a network device. Optionally, the communication system may include multiple network devices 1203, and other numbers of terminal devices may be included within the coverage of each network device 1203, which is not limited in this embodiment of the present application.

It should be noted that FIG. 1 to FIG. 3 are only illustrations of the systems to which the disclosure is applicable. The methods in implementations of the disclosure may also be applied to other systems, for example, 5G communication system, LTE communication system, etc., which is not specifically limited in implementations of the disclosure.

Optionally, the wireless communication systems illustrated in FIG. 1 to FIG. 3 may also include other network entities, such as a mobility management entity (MME), an access and mobility management function (AMP), etc., which is not limited in implementations of the disclosure.

It should be understood that, in implementations of the disclosure, a device with communication functions in a network/system may be referred to as a "communication device". Taking the communication system 100 illustrated in FIG. 1 as an example, the communication device may include the network device 110 and the terminal device 120 that have communication functions. The network device 110 and the terminal device 120 may be the devices described above, which will not be repeated again herein. The communication device may further include other devices such as a network controller, a mobile management entity, or other network entities in the communication system 100, and implementations of the disclosure are not limited in this regard.

It should be understood that, the terms "system" and "network" herein are usually used interchangeably throughout the disclosure. The term "and/or" herein only describes an association relationship between associated objects, which means that there may be three relationships. For example, A and/or B may mean A alone, both A and B exist, and B alone. In addition, the character "/" herein generally indicates that the associated objects are in an "or" relationship.

It should be understood that, the term "indication" in implementations of the disclosure may be a direct indication, an indirect indication, or an indication of having an associated relationship. For example, A indicates B, which may mean that A directly indicates B, for example, B may be obtained through A. It may also mean that A indirectly indicates B, for example, A indicates C, and B may be obtained through C. It may also mean that there is an association relationship between A and B.

In descriptions of implementations of the disclosure, the term "corresponding to" may mean that there is a direct correspondence or an indirect correspondence between the two, or an associated relationship, a relationship of indicating and being indicated, a relationship of configuring and being configured, etc.

In implementations of the disclosure, the "predefinition" can be implemented by pre-storing in devices (e.g., including the terminal device and the network device) corresponding codes, tables or other means available for indicating relevant information, which are not limited in the disclosure. For example, the predefinition may refer to a definition in a protocol.

In implementations of the disclosure, the "protocol" may refer to a standard protocol in the field of communication, which may include, for example, a LTE protocol, an NR protocol and related protocols applied to future communication systems, which is not limited in this disclosure.

HARQ Mechanism in NR System

Two-stage retransmission mechanisms are introduced in NR system, that is, a hybrid automatic repeat request (HARQ) mechanism in a media access control (MAC) layer and an automatic repeat request (ARQ) mechanism in a radio link control (RLC) layer. The retransmission of lost or erroneous data is mainly handled by the HARQ mechanism in the MAC layer and supplemented by the retransmission function in the RLC layer. The HARQ mechanism in the MAC layer can provide fast retransmission, and the ARQ mechanism in the RLC layer can provide reliable data transmission.

In HARQ, a stop-and-wait protocol is used to transmit data. In the stop-and-wait protocol, after transmitting a transport block (TB), the transmitter stops and waits for acknowledgment. In this way, since the transmitter stops and waits for an acknowledgment after each transmission, user throughput is relatively low. Therefore, multiple parallel HARQ processes are used in NR. When one HARQ process is waiting for the acknowledgment, the transmitter may continue data transmission using another HARQ process. These H ARQ processes together form a HARQ entity, which allows continuous data transmission in combination with the stop-and-wait protocol. H ARQ may be classified as uplink HARQ and downlink HARQ. The uplink HARQ is for uplink data transmission, and the downlink HARQ is for downlink data transmission. The uplink HARQ and the downlink HARQ are independent of each other.

In some cases, for each serving cell, the terminal device has a corresponding HARQ entity. Each HARQ entity maintains a set of parallel downlink HARQ processes and a set of parallel uplink HARQ processes. As an example, a maximum number of 16 HARQ processes are supported in each uplink/downlink carrier. According to network device deployment, the network device may indicate the maximum number of HARQ processes to the terminal device through semi-persistent configuration with radio resource control (RRC) signaling. Optionally, in some implementations, if the network device does not provide corresponding configuration parameters, a default number of HARQ processes in the downlink is 8, and the maximum number of HARQ processes supported in each carrier in the uplink is always 16. Each HARQ process corresponds to a HARQ process ID (also referred to as a HARQ process number). For downlink, a dedicated broadcast HARQ process is used for a broadcast control channel (BCCH). For uplink. HARQ ID 0 is used for message 3 (Msg3) transmission in a random procedure.

In some implementations, for a terminal device that does not support downlink space division multiplexing, only one TB can be processed in each downlink HARQ process simultaneously. For a terminal device that supports downlink space division multiplexing, one or two TBs can be processed in each downlink HARQ process simultaneously. One TB is processed in each uplink HARQ process of the terminal device simultaneously.

HARQ may be classified as synchronous HARQ and asynchronous HARQ in the time domain, and may be classified as non-adaptive HARQ and adaptive HARQ in the frequency domain. In NR, the asynchronous adaptive HARQ mechanism are used for both uplink and downlink. For asynchronous HARQ, a time interval between a retransmission and a previous transmission of the same TB is not fixed. For adaptive HARQ, frequency-domain resources and modulation and coding scheme (MCS) used for retransmission may be changed.

In the NR system, the network device may perform downlink configuration through a downlink MAC control element (CE). For an effective time of the MAC CE, a processing delay of the terminal is mainly considered.

Figure 4:
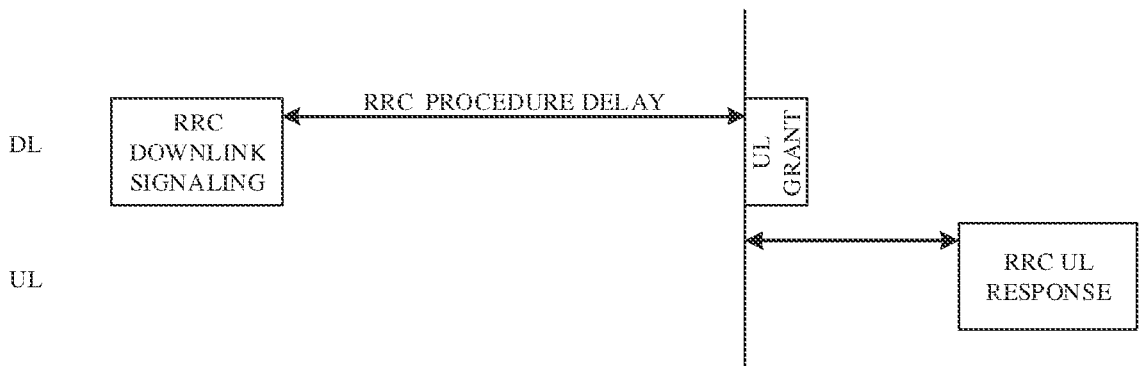
FIG. 4 is a schematic diagram illustrating an RRC procedure processing delay.

The network device may also perform downlink configuration through RRC downlink signaling (or called RRC message, downlink RRC message, or RRC downlink message, etc.). For a RRC procedure processing delay, the processing delay of the terminal is also mainly considered. As illustrated in FIG. 4, the RRC procedure processing delay is defined as a requirement for a time interval from when the terminal device receives the RRC downlink signaling to when terminal device is ready to receive an uplink grant for transmitting an RRC uplink response (or uplink RRC message) for the RRC downlink signaling. Different RRC procedures have different processing delay requirements. For example, an RRC procedure processing delay corresponding to an RRC reconfiguration message is 10 ms, and an RRC procedure processing delay corresponding to an RRC reconfiguration message used for secondary cell (SCell) addition/release is 16 ms, etc.

Compared with the traditional cellular network, a propagation delay between the UE and the satellite in the NTN is relatively large, especially in the GEO satellite scenario. For the NTN network, if the current effective time of the downlink MAC CE and the RRC procedure processing delay requirement are still used, the network device may not be able to use an updated configuration because the network device has not received feedback information from the UE for the downlink control signaling, thus resulting in inconsistent understanding between the UE side and the network side.

Figure 5:
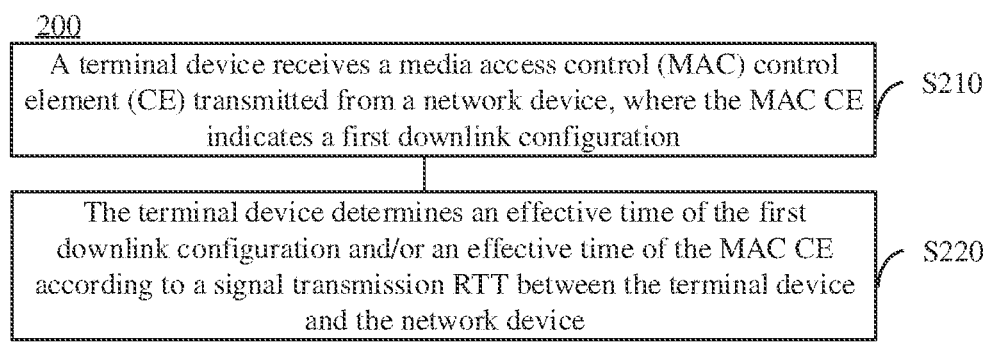
FIG. 5 is a schematic diagram of a wireless communication method provided in implementations of the disclosure.

FIG. 5 is a schematic flowchart of a wireless communication method 200 provided in implementations of the disclosure. As illustrated in FIG. 5, the method 200 may include at least part of the following.

At S210, a terminal device receives a MAC CE transmitted from a network device, where the MAC CE indicates a first downlink configuration.

At S220, the terminal device determines an effective time of the first downlink configuration and/or an effective time of the MAC CE according to a signal transmission round trip time (RTT) between the terminal device and the network device.

It should be understood that in implementations of the disclosure, the downlink configuration is exemplarily indicated by the MAC CE. In other implementations, the downlink configuration may also be indicated by other downlink control signaling, for example, downlink control information (DCI). RRC message, etc. When the downlink configuration is indicated by other downlink control signaling, the effective time of the downlink configuration or the effective time of the downlink control signaling may also be determined in a similar manner. For the sake of brevity, details are not described herein.

In implementations of the disclosure, the downlink control signaling indicating the downlink configuration may be transmitted over a physical downlink shared channel (PDSCH), and the PDSCH is transmitted in a first HARQ process, where an HARQ feedback function of the first HARQ process is enabled, that is, the PDSCH needs to be fed back.

In other words, when receiving the downlink control signaling carried in the PDSCH transmitted in the HARQ process with the HARQ feedback function enabled, the terminal device may determine the effective time of the downlink configuration indicated by the downlink control signaling or the effective time of the downlink control channel according to the signal transmission RTT.

It should be noted that specific implementations of the first downlink configuration are not limited in the disclosure. For example, the first downlink configuration may be used for activating or deactivating a SCell, activating or deactivating a transmission configuration indicator (TCI) state, or other downlink configurations, which is not limited in the disclosure. If the first downlink configuration indicates other downlink configurations, the terminal device may also determine the effective time of the downlink configuration or the effective time of the downlink control channel according to the signal transmission RTT and a time required for an event that affect the effective time of the downlink configuration.

Optionally, in some implementations, a TCI state may contain the following configurations:
 a TCI state identity (ID) identifying the TCI state;
 Quasi-co-located (QCL) information 1; and
 QCL information 2.

The QCL information may contain the following information:
 QCL type configuration, for example, QCL type A, QCL type B, QCL type C, or QCL type); and
 QCL reference signal configuration, including a cell ID corresponding to the reference signal, a bandwidth part (BWP) ID, and a reference signal ID (which may be a channel state information reference signal (CSI-RS) resource ID or a synchronization signal block (SSB) index).

By way of example rather than limitation, different QCL type configurations may be defined as follows:
 'QCL-TypeA': {Doppler shift, Doppler spread, average delay, delay spread);
 'QCL-TypeB': {Doppler shift, Doppler spread};
 'QCL-TypeC': Doppler shift, average delay};
 'QCL-TypeD': {spatial Rx parameter}.

Optionally, in some implementations, the signal transmission RTT is determined according to a timing advance (TA) for the terminal device, or determined according to an RTT between the terminal device and the terminal device, or configured by the network device, or a predefined value.

In implementations of the disclosure, the signal transmission RTT between the terminal device and the network device is taken into account for the determination of the effective time of the downlink configuration or the effective time of the downlink control channel, which can ensure that the network device can receive the feedback information for the downlink control signaling from the terminal device and then use the updated downlink configuration, thus ensuring consistent understanding of the effective time of the downlink configuration or the effective time of the downlink control channel between the network device and the terminal device.

In implementations of the disclosure, the terminal device may determine the effective time of the downlink control signaling according to the signal transmission RTT and a time required for an event that affects the effective time of the downlink configuration. For different downlink configurations, the event that affects the effective time of the downlink configuration may be different, and thus the effective time may be determined differently.

In the following example, the downlink control channel is MAC CE, the first downlink configuration is for activating or deactivating a SCell or activating a TCI state, and the determination of the effective time of the downlink configuration or the MAC CE is described. The disclosure is not limited to this example.

It should be noted that in implementations of the disclosure, the effective time is in units of slots as an example, which is not limited in the disclosure. In other implementations, the effective time may be in other time unit, such as sub-frame, symbol, etc. If the effective time is in another time unit, corresponding parameters may be transformed into the same time unit by multiplying corresponding coefficients.

In some implementations, the MAC CE indicates activating or deactivating a SCell.

In this implementation, the MAC CE may be a SCell activation/deactivation MAC CE, and the MAC CE may be transmitted over the PDSCH.

Case 1, the MAC CE indicates activating at least one SCell.

In this case, the terminal device determines an activation effective time of the at least one SCell according to the signal transmission RTT and first information. The first information includes at least one of the following:
  a feedback delay of the PDSCH carrying the MAC CE;
  a first parameter, where the first parameter is a preset value or a value determined according to capability of the terminal device;
  an activation delay of the at least one SCell; or
  a reporting delay of channel state information (CSI) for the at least one SCell.

If the downlink configuration indicated by the MAC CE is for activating the SCell, the event that affects the effective time of the downlink configuration may include feedback for the PDSCH, activating of the SCell, and reporting of CSI for the SCell. Therefore, the activation effective time of the SCell may be determined based on the signal transmission RTT and a time required for the above events.

In implementations of the disclosure, the feedback delay of the PDSCH may be a time interval from when the terminal device receives the PDSCH to when the terminal device transmits the HARQ feedback information for the PDSCH. For example, if the terminal device receives the PDSCH in slot n and transmits the HARQ feedback information for the PDSCH in slot m, the feedback delay of the PDSCH may be the time interval between slot n and slot n.

In implementations of the disclosure, the reporting delay of the CSI for the SCell may include a time for the terminal device to obtain the first available downlink CSI reference resource, a processing time for the terminal device to prepare for CSI reporting, and a time for the terminal device to obtain the first available CSI reporting resource.

Optionally, in implementations of the disclosure, the first parameter may indicate a processing delay of the terminal device. Specifically, the processing delay may include a processing delay after the terminal device completes the HARQ feedback for the PDSCH, such as a time for the terminal device to switch from uplink transmission to downlink reception, and/or a time for the terminal device to parse data packets, such as a time for parsing a MAC protocol data unit (PDU), where the MAC PDU includes the MAC CE.

In some implementations, the first parameter may be a preset value, such as 3 ms, or may also be determined according to the processing capability of the terminal device. For example, for a terminal device with strong processing capability, the first parameter may be less than 3 ms, and for a terminal device with low processing capability, such as a reduced capability terminal, the first parameter may be greater than 3 ms.

Therefore, in case 1, the terminal device may determine the activation effective time of the SCell according to the signal transmission RTT and a delay related to activation of the SCell, which is beneficial to ensure consistent understanding of the activation effective time of the SCell between the terminal device and the network device.

In some implementations, according to the feedback delay of the PDSCH, the first parameter, and the signal transmission RTT, the terminal device determines that the activation effective time of the at least one SCell is not earlier than a first slot.

In some implementations, according to the activation delay of the at least one SCell, the reporting delay of the CSI for the at least one SCell, and the signal transmission RTT, the terminal device determines that the activation effective time of the at least one SCell is not later than a second slot.

That is, the activation effective time of the at least one SCell is between the first slot and the second slot.

As an example, the first slot $S_1$ is determined according to the following formula:

$$S_1 = n + k1 + \max\{X * N_{slot}^{subframe,\mu}, K_{offset}\} + 1,$$

where n represents a slot in which the MAC CE is received, that is, the slot in which the PDSCH is received, k1 represents the feedback delay of the PDSCH, X represents the first parameter, $$N_{slot}^{subframe,\mu}$$

represents the number of slots contained in a subframe corresponding to a subcarrier spacing μ for transmitting feedback information for the PDSCH, and $K_{offset}$ represents the signal transmission RTT.

As an example, the second slot $S_2$ is determined according to the following formula:

$$S_2 = n + k1 + \max\{T_{actication\_time} + T_{CSI\_reporting}, K_{offset}\},$$

where n represents a slot in which the MAC CE is received, k1 represents the feedback delay of the PDSCH, $T_{actication\_time}$ represents the activation delay of the at least one SCell, $T_{CSI\_reporting}$ represents the reporting delay of the CSI for the at least one SCell, and $K_{offset}$ represents the signal transmission RTT.

Optionally, in some implementations, $$N_{slot}^{subframe,\mu}$$

may be 1, 2, etc.

Figure 6:
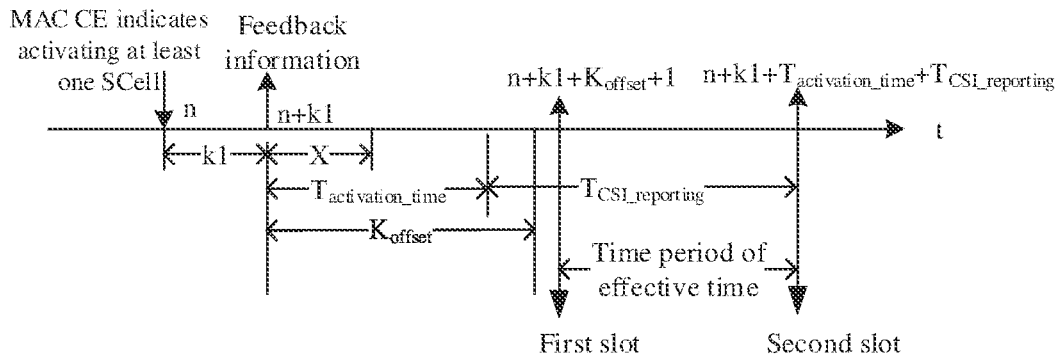
FIG. 6 is a schematic diagram illustrating an activation effective time of a secondary cell (SCell) when a MAC CE indicates activating the SCell.

FIG. 6 illustrates a specific example of case 1. It should be noted that in this example, $$N_{slot}^{subframe,\mu}$$

is 1.

As illustrated in FIG. 6, the terminal device receives a PDSCH in slot n. The PDSCH carries a SCell activation/deactivation MAC CE. The MAC CE indicates activating at least one SCell, and $$X * N_{slot}^{subframe,\mu} < K_{offset}.$$

Then the first slot $S_1$ may be slot $n+k1+K_{offset}+1$, and the second slot $S_2$ may be slot $n+k1+T_{activation\_time}+T_{CSI\_reporting}$.

Case 2: the MAC CE indicates deactivating at least one SCell.

If the downlink configuration indicated by the MAC CE is for deactivating the SCell, the terminal device does not need to activate the SCell or report CSI for the SCell. Therefore, the activation delay of the SCell and the reporting delay of the CSI for the SCell may not be considered, and only the feedback delay of the PDSCH and the processing delay of the terminal device are considered.

In some implementations, the terminal device determines a deactivation effective time of the at least one SCell according to the signal transmission RTT and second information, where the second information includes at least one of:
  a feedback delay of the PDSCH, where the PDSCH carries the MAC CE; or
  a first parameter, where the first parameter is a preset value or a value determined according to capability of the terminal device.

For description of the first parameter and the feedback delay of the PDSCH, reference may be made to case 1, which will not be repeated herein for brevity.

Therefore, in case 2, the terminal device may determine the deactivation effective time of the SCell according to the signal transmission RTT and a delay related to deactivation of the SCell, which is beneficial to ensure consistent understanding of the deactivation effective time of the SCell between the terminal device and the network device.

In some implementations, according to the feedback delay of the PDSCH, the first parameter, and the signal transmission RTT, the terminal device determines that the deactivation effective time of the at least one SCell is not later than a third slot.

As an example, the third slot $S_3$ is determined according to the following formula:

$$S_1 = n + k1 + \max\{X * N_{slot}^{subframe,\mu}, K_{offset}\},$$

where n represents a slot in which the MAC CE is received, k1 represents the feedback delay of the PDSCH, X represents the first parameter, $$N_{slot}^{subframe,\mu}$$

represents the number of slots contained in a subframe corresponding to a subcarrier spacing μ for transmitting feedback information for the PDSCH, and $K_{offset}$ represents the signal transmission RTT.

Figure 7:
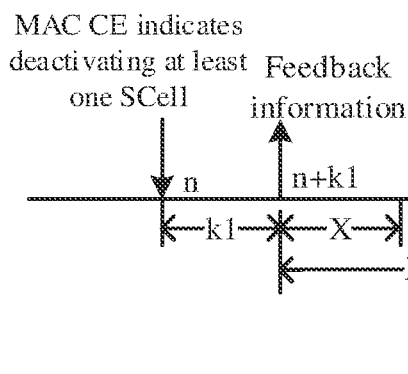
FIG. 7 is a schematic diagram illustrating a deactivation effective time of a SCell when a MAC CE indicates deactivating the SCell.

FIG. 7 illustrates a specific example of case 2. It should be noted that in this example, $$N_{slot}^{subframe,\mu}$$

As illustrated in FIG. 7, the terminal device receives a PDSCH in slot n. The PDSCH carries a SCell activation/deactivation MAC CE. The MAC CE indicates deactivating at least one SCell, and $$X * N_{slot}^{subframe,\mu} < K_{offset}.$$

Then the third slot $S_3$ may be slot $n+k1+K_{offset}$, and the deactivation effective time of the SCell is not later than slot $n+k1+K_{offset}$.

In some implementations, the MAC CE is used to activate a TCI state.

In this implementation, the MAC CE may be a UE-specific physical downlink control channel (PDCCH) TCI state indication MAC CE.

The MAC CE is transmitted over a PDSCH, a HARQ feedback function corresponding to a HARQ process for transmitting the PDSCH is enabled, and the terminal device decodes the PDSCH successfully. Then the terminal device may determine the effective time of the TCI state or the effective time of the MAC CE as follows.

In some implementations, the terminal device determines the effective time of the MAC CE according to the signal transmission RTT and third information, where the third information include at least one of:
  a feedback delay of the PDSCH carrying the MAC CE; or
  a first parameter, where the first parameter is a preset value or a value determined according to capability of the terminal device.

As an example, the effective time of the MAC CE is a fourth slot $S_4$, and the fourth slot $S_4$ is determined according to the following formula:

$$S_4 = n + k1 + \max\{X * N_{slot}^{subframe,\mu}, K_{offset}\} + 1,$$

wherein n represents a slot in which the MAC CE is received, k1 represents the feedback delay of the PDSCH, X represents the first parameter, $$N_{slot}^{subframe,\mu}$$

represents the number of slots contained in a subframe corresponding to a subcarrier spacing µ for transmitting feedback information for the PDSCH, and $K_{offset}$ represents the signal transmission RTT.

Figure 8:
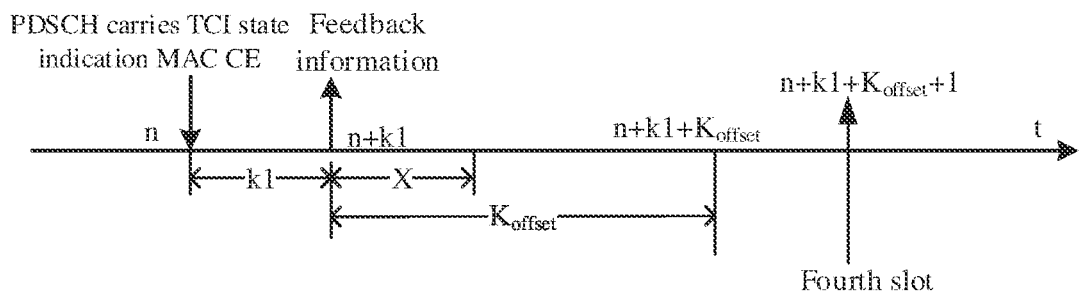
FIG. 8 is a schematic diagram illustrating an activation effective time of a MAC CE when the MAC CE indicates activating a TCI state.

FIG. 8 illustrates a specific example of determining the effective time of the MAC CE. In this example.

$$N_{slot}^{subframe,\mu}$$

is 1.

As illustrated in FIG. 8, the terminal device receives the UE-specific PDCCH TCI state indication MAC CE in slot n, and $$X * N_{slot}^{subframe,\mu} < K_{offset}.$$

Then the fourth slot $S_4$ may be slot $n+k1+K_{offset}+1$, that is, the effective time of the MAC CE may be slot $n+k1+K_{offset}+1$.

In other implementations, the terminal device determines an activation effective time of a target TC state according to the signal transmission RTT and fourth information, where the fourth information includes at least one of:
  whether the target TCI state is known;
  a feedback delay of the PDSCH carrying the MAC CE;
  a first parameter, where the first parameter is a preset value or a value determined according to capability of the terminal device;
  a second parameter, where the second parameter has a value determined according to whether the target TCI state is in a list of activated TCI states of the terminal device;
  a first time interval representing a time interval from when the terminal device obtains the MAC CE by decoding to a first transmission of a SSB;
  a duration for the terminal device to process the SSB;
  a first duration representing a time required for beam quality measurement, where the beam quality measurement is for receiving beam adjustment; or
  a third parameter, where the third parameter has a value determined according to a reference signal used for the beam quality measurement.

In this implementation, for specific description of the feedback delay of the PDSCH and the first parameter, reference may be made to implementation 1, which will not be repeated herein for brevity.

As an example, the TCI state is considered to be known when at least one of the following conditions are satisfied:
  a TCI state switching command is received within 1280 ms of the last transmission of a reference signal (RS) resource, where the RS resource is used for beam reporting or measurement for the TCI state;
  the UE has transmitted at least one measurement report for the TCI state;
  the TCI state can still be detected during ICI state switching;
  a SSB related to the TCI state can still be detected during TCI state switching; or
  a signal-to-noise ratio for the TCI state ≥−3 db.

If any of the above conditions is not met, the TCI status is considered to be unknown.

Optionally, in some implementations, if the target TCI state activated through the MAC CE is in the list of activated TCI states of the terminal device, the value of the second parameter may be 0; otherwise, the value of the second parameter may be 1. The disclosure is not limited thereto.

Activation of the TCI state may require receiving-beam adjustment. Therefore, the beam quality measurement is required. The first duration is the time required for the beam quality measurement. Optionally, the beam quality may be, for example, Layer 1-reference signal receiving power (L1-RSRP) or other quality parameters, such as reference signal receiving quality (RSRQ) and signal to interference plus noise ratio (SINR). That is, the first duration may be the time required for L1-RSRP measurement for receiving-beam adjustment.

Optionally, the third parameter may be determined according to the reference signal used for beam quality measurement. For example, for CSI-RS-based L1-RSRP measurement, the value of the third parameter may be 1. For SSB-based L1-RSRP measurement, the value of the third parameter may be 0. The disclosure is not limited thereto.

The first time interval may be the time interval from when the terminal device obtains the MAC CE by decoding to the first transmission of the SSB. It should be noted that the SSB may also be called a synchronization signal/physical broadcast channel block (SS/PBCH block).

In the following, a specific manner of determining the activation effective time of the TCI state will be described in combination with two cases of the TCI state.

Case 1: the TCI state is known.

In some implementations, according to the feedback delay of the PDSCH, the first parameter, the second parameter, the first time interval, the duration for the terminal device to process the SSB, and the signal transmission RTT, the terminal device determines that the activation effective time of the target TO state activated by the MAC CE is not later than a fifth slot.

In other implementations, according to the feedback delay of the PDSCH, the first parameter, the second parameter, the first time interval, and the signal transmission RTT, the terminal device determines that the terminal device is capable of receiving a PDCCH in an original TCI state (that is, a TCI state activated before the target TCI state) till a sixth slot.

As an example, the fifth slot $S_5$ is determined according to the following formula:

$$S_5 = n+k1+\max\{X+T0k*(T_{first-SSB}+T_{SSB-proc}), K_{offset}\},$$

where n represents a slot in which the MAC CE is received, that is, a slot in which the PDSCH is received, k1 represents the feedback delay of the PDSCH, X represents the first parameter, T0k represents the second parameter, $T_{first-SSB}$ represents the first time interval, $T_{SSB-proc}$ represents the duration for the terminal device to process the SSB, and $K_{offset}$ represents the signal transmission RTT.

As an example, the sixth slot $S_h$ is determined according to the following formula:

$$S_6 = n+k1+\max\{X+T0k*T_{first-SSB}, K_{offset}\},$$

where n represents a slot in which the MAC CE is received, k1 represents the feedback delay of the PDSCH, X represents the first parameter, T0k represents the second parameter, $T_{first-SSB}$ represents the first time interval, and $K_{offset}$ represents the signal transmission RTT.

FIG. 9 illustrates a specific example of case 1. As illustrated in FIG. 9, the terminal device receives a TCI state indication MAC CE in slot n, where the MAC CE indicates activating a target TCI state, and the target TCI state is not in a list of activated TCI states of the terminal device. Then the second parameter has a value of 1. $X+T_{first-SSB}<K_{offset}$, and $X+T_{first-SSB}+T_{SSB-proc}>K_{offset}$. Then the fifth slot $S_5$ may be slot $n+k1+X+T_{first-SSB}+T_{SSB-proc}$, the sixth slot $S_6$ may be slot $n+k1+K_{offset}$.

Case 2: the TCI state is unknown.

In some implementations, according to the feedback delay of the PDSCH, the first parameter, the first duration, the third parameter, the first time interval, the duration for the terminal device to process the SSB, and the signal transmission RTT, the terminal device determines that the activation time of the target TCI state is not later than a seventh slot.

In some implementations, according to the feedback delay of the PDSCH, the first parameter, the first duration, the third parameter, the first time interval, and the signal transmission RTT, the terminal device determines an eighth slot, where the terminal device is capable of receiving a PDCCH in an original TCI state till the eighth slot, and the original TCI state is activated before the target TCI state indicated by the MAC CE.

As an example, the seventh slot $S_7$ is determined according to the following formula:

$$S_7 = n+k1+\max\{X+T_{L1-RSRP}+T0uk*(T_{first-SSB}+T_{SSB-proc}), K_{offset}\},$$

where n represents a slot in which the MAC CE is received, k1 represents the feedback delay of the PDSCH, X represents the first parameter, $T_{L1-RSRP}$ represents the first duration. T0uk represents the third parameter, $T_{first-SSB}$ represents the first time interval, $T_{SSB-proc}$ represents the duration for the terminal device to process the SSB, and $K_{offset}$ represents the signal transmission RTT.

As an example, the eighth slot $S_8$ is determined according to the following formula:

$$S_8 = n+k1+\max\{X+T_{L1-RSRP}+T0uk*T_{first-SSB}, K_{offset}\},$$

where n represents a slot in which the MAC CE is received, k1 represents the feedback delay of the PDSCH. X represents the first parameter, $T_{L1-RSRP}$ represents the first time length, T0uk represents the third parameter, $T_{first-SSB}$ represents the first time interval, and $K_{offset}$ represents the signal transmission RTT.

FIG. 10 illustrates a specific example of case 2. As illustrated in FIG. 10, the terminal device receives the TCI state indication MAC CE in slot n, and the MAC CE indicates activating the target TCI state. L1-RSRP measurement is performed based on CSI-RS. Then the third parameter T0uk has a value of 1. $X+T_{first-SSB}+T_{L1-RSRP}<K_{offset}$, and $X+T_{first-SSB}+T_{L1-RSRP}+T_{SSB-proc}>K_{offset}$. Then the seventh slot $S_7$ may be slot $n+k1+X+T_{L1-RSRP}+T_{first-SSB}+T_{SSB-proc}$, and the eighth slot $S_8$ may be slot $n+k1+K_{offset}$.

It should be understood that in implementations of the disclosure, the network device may also determine the effective time of the downlink control signaling or the effective time of the downlink configuration in a similar manner, and then use the updated configuration at the effective time.

In summary, in implementations of the disclosure, the terminal device may determine the effective time of the downlink configuration or the effective time of the downlink control channel based on the signal transmission RIT between the terminal device and the network device and the time required for the event related to the downlink configuration indicated by the downlink control signaling. In this way, the network device can receive the feedback information for the downlink control signaling from the terminal device, thus ensuring that the network device and the terminal device have consistent understanding of the effective time of the downlink configuration.

FIG. 11 is a schematic flowchart of a wireless communication method 300 according to another implementation of the disclosure. The method 300 may be performed by the terminal device in the communication system illustrated in FIG. 1. As illustrated in FIG. 11, the method 300 includes the following.

At S310, the terminal device receives an RRC message transmitted from a network device.

At S320, the terminal device determines an RRC procedure processing delay corresponding to the RRC message according a signal transmission RTT between the terminal device and the network device.

In implementations of the disclosure, as illustrated in FIG. 4, the RRC procedure processing delay is a requirement for a time interval from when the terminal device receives the RRC message to when the terminal device is ready to receive an uplink grant for transmitting an RRC uplink response (or called uplink RRC message) for the RRC message.

It should be understood that, in implementations of the disclosure, the RRC message may be any RRC message, such as an RRC reconfiguration message, an RRC establishment message, an RRC release message, an RRC recovery message, etc., which is not limited herein.

In implementations of the disclosure, the RRC message may be transmitted over a PDSCH, and the PDSCH is transmitted in the first HARQ process, where an HARQ feedback function of the first HARQ process is enabled, that is, the PDSCH needs to be fed back.

In other words, when receiving the RRC message carried in the PDSCH transmitted in the HARQ process with the HARQ feedback function enabled, the terminal device may determine the RRC procedure processing delay corresponding to the RRC message according to the signal transmission RTT.

In some cases, such as a NTN scenario, a distance between the terminal device and the network device is relatively large. If only the processing delay of the terminal is considered, the network device may not be able to use an updated downlink configuration because the network device does not receive an uplink response from the terminal device within this delay, which leads to inconsistent understanding between the terminal device and the network device.

Therefore, in implementations of the disclosure, according to the signal transmission RTT, a processing delay of the RRC message, and a feedback delay of the PDSCH carrying the RRC message, the terminal device determines the RRC procedure processing delay corresponding to the RRC message.

Optionally, in implementations of the disclosure, the processing delay of the RRC message may include a processing delay after the terminal device completes the HARQ feedback for the PDSCH, such as a time for the terminal device to switch from uplink transmission to downlink reception, and/or a time for the terminal device to parse a MAC PDU, where the MAC PDU includes the MAC CE.

As an example, the RRC procedure processing delay $T_{delta}$ corresponding to the RRC message is determined according to the following formula:

$$T_{delta} = \max\{T_{processing\ delay}, k1+K_{offset}\},$$

where $T_{processing\ delay}$ represents the processing delay of the RRC message, k1 represents the feedback delay of the PDSCH, and $K_{offset}$ represents the signal transmission RTT.

Figure 12:
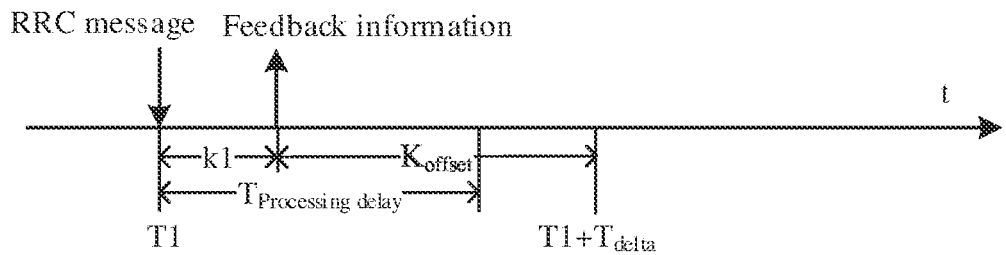
FIG. 12 is a schematic diagram illustrating an RRC procedure processing delay according to implementations of the disclosure.

FIG. 12 illustrates a specific example according to implementations of the disclosure. As illustrated in FIG. 12, the terminal device receives a PDSCH at time T1, where the PDSCH carries an RRC message, and a processing delay $T_{processing\_delay}$ corresponding to the RRC message is less than a sum of a feedback delay k1 of the PDSCH and a signal transmission RTT $K_{offset}$. Then the RRC procedure processing delay $T_{delta}$ corresponding to the RRC message may be determined as k1+$K_{offset}$. That is, it can be considered that the terminal device is ready to receive the UL grant for transmitting the uplink response corresponding to the RRC message at T1+$T_{delta}$.

It should be understood that in implementations of the disclosure, the network device may also determine the RRC procedure processing delay corresponding to the RRC message in a similar manner, and then transmits the UL grant based on the RRC procedure processing delay.

Therefore, in implementations of the disclosure, the terminal device may determine the RRC procedure processing delay based on the signal transmission RTT between the terminal device and the network device and the processing delay of the terminal device. In this way, the network device can accurately determine the time at which the terminal device is ready to receive the UL grant for transmitting the uplink response corresponding to the RR C message, and then transmit the UL grant, thus avoiding reception failure of the UL grant caused by early transmission of the UL grant when the terminal device is not ready to receive the UL grant.

The method implementations of the disclosure is described in detail above in conjunction with FIG. 5 to FIG. 12, and the apparatus implementations of the disclosure is described in detail below in conjunction with FIG. 13 to FIG. 16. It should be understood that the apparatus implementations correspond to the method implementations. For similar descriptions, reference may be made to the method implementations.

Figure 13:
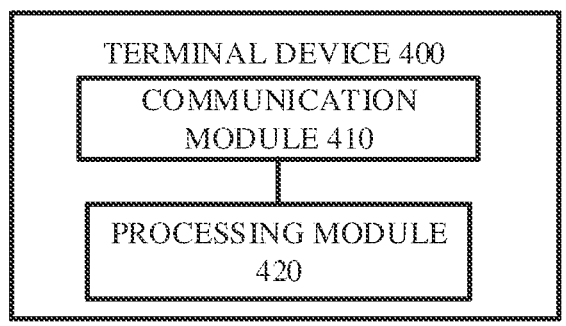
FIG. 13 is a schematic block diagram of a terminal device provided in implementations of the disclosure.

FIG. 13 illustrates a schematic block diagram of a terminal device 400 according to implementations of the disclosure. As illustrated in FIG. 13, the terminal device 400 includes a communication unit 410 and a processing unit 420.

The communication unit 410 is configured to receive a MAC CE transmitted from a network device, where the MAC CE indicates a first downlink configuration.

The processing unit 420 is configured to determine an effective time of the first downlink configuration and/or an effective time of the MAC CE according to a signal transmission RTT between the terminal device and the network device.

Optionally, in some implementations, the MAC CE indicates activating at least one SCell, and the processing unit 420 is specifically configured to determine an activation effective time of the at least one SCell according to the signal transmission RTT and first information. The first information includes at least one of:
 a feedback delay of a PDSCH carrying the MAC CE;
 a first parameter, wherein the first parameter is a preset value or a value determined according to capability of the terminal device;
 an activation delay of the at least one SCell; or
 a reporting delay of CSI for the at least one SCell.

Optionally, in some implementations, the processing unit 420 is specifically configured to determine a first slot according to the feedback delay of the PDSCH, the first parameter, and the signal transmission RIT, wherein the activation effective time of the at least one SCell is not earlier than the first slot, and/or determine a second slot according to the activation delay of the at least one SCell, the reporting delay of the CSI for the at least one SCell, and the signal transmission RTT, wherein the activation effective time of the at least one SCell is not later than the second slot.

Optionally, in some implementations, the first slot $S_1$ is determined according to a formula:

$$S_1 = n + k1 + \max\{X * N_{slot}^{subframe,\mu}, K_{offset}\} + 1,$$

wherein n represents a slot in which the MAC CE is received, k1 represents the feedback delay of the PDSCH, X represents the first parameter, $$N_{slot}^{subframe,\mu}$$

represents a number of slots contained in a subframe corresponding to a subcarrier spacing μ for transmitting feedback information for the PDSCH, and $K_{offset}$ represents the signal transmission RTT.

Optionally, in some implementations, the second slot $S_2$ is determined according to a formula:

$$S_2 = n + k1 + \max\{T_{activation\_time} + T_{CSI\_reporting}, K_{offset}\}$$

wherein n represents a slot in which the MAC CE is received, k1 represents the feedback delay of the PDSCH, $T_{activation\_time}$ represents the activation delay of the at least one SCell, $T_{CSI\_reporting}$ represents the reporting delay of the CSI, and $K_{offset}$ represents the signal transmission RTT.

Optionally, in some implementations, the MAC CE indicates deactivating at least one SCell, and the processing unit 420 is specifically configured to determine a deactivation effective time of the at least one SCell according to the signal transmission RTT and second information, wherein the second information comprises at least one of:
 a feedback delay of a PDSCH carrying the MAC CE; or
 a first parameter, wherein the first parameter is a preset value or a value determined according to capability of the terminal device.

Optionally, in some implementations, the processing unit 420 is specifically configured to determine a third slot according to the feedback delay of the PDSCH, the first parameter, and the signal transmission RTT, wherein the deactivation effective time of the at least one SCell is not later than the third slot.

Optionally, in some implementations, the third slot $S_3$ is determined according to a formula:

$$S_3 = n + k1 + \max\{X * N_{slot}^{subframe,\mu}, K_{offset}\},$$

wherein n represents a slot in which the MAC CE is received, k1 represents the feedback delay of the PDSCH, X represents the first parameter, $$N_{slot}^{subframe,\mu}$$

represents a number of slots contained in a subframe corresponding to a subcarrier spacing μ for transmitting feedback information for the PDSCH, and $K_{offset}$ represents the signal transmission RTT.

Optionally, in some implementations, the MAC CE indicates activating a first TCI state, and the processing unit 420 is specifically configured to determine the effective time of the MAC CE according to the signal transmission RTT and third information. The third information comprises at least one of:

- a feedback delay of a PDSCH carrying the MAC CE; or
- a first parameter, wherein the first parameter is a preset value or a value determined according to capability of the terminal device.

Optionally, in some implementations, the effective time of the MAC CE is a fourth slot $S_4$, and the fourth slot $S_4$ is determined according to a formula:

$$S_4 = n + k1 + \max\{X * N_{slot}^{subframe,\mu}, K_{offset}\} + 1,$$

wherein n represents a slot in which the MAC CE is received, k1 represents the feedback delay of the PDSCH, X represents the first parameter, $$N_{slot}^{subframe,\mu}$$

represents a number of slots contained in a subframe corresponding to a subcarrier spacing $\mu$ for transmitting feedback information for the PDSCH, and $K_{offset}$ represents the signal transmission RTT.

Optionally, in some implementations, the MAC CE indicates activating a first TCI state, and the processing unit 420 is specifically configured to determine an activation effective time of the first TCI state according to the signal transmission RTT and fourth information. The fourth information comprises at least one of:

- whether the first TCI state is known;
- a feedback delay of a PDSCH carrying the MAC CE;
- a first parameter, wherein the first parameter is a preset value or a value determined according to capability of the terminal device;
- a second parameter, wherein the second parameter has a value determined according to whether the first TCI state is in a list of activated TCI states of the terminal device;
- a first time interval representing a time interval from when the terminal device obtains the MAC CE by decoding to a first transmission of a synchronous signal block (SSB);
- a duration for the terminal device to process the SSB;
- a first duration representing a time required for beam quality measurement, wherein the beam quality measurement is for receiving beam adjustment; or
- a third parameter, wherein the third parameter has a value determined according to a reference signal used for the beam quality measurement.

Optionally, in some implementations, the processing unit 420 is specifically configured to determine a fifth slot according to the feedback delay of the PDSCH, the first parameter, the second parameter, the first time interval, the duration for the terminal device to process the SSB, and the signal transmission RTT, wherein the activation effective time of the first TCI state is not later than the fifth slot, and/or determine a sixth slot according to the feedback delay of the PDSCH, the first parameter, the second parameter, the first time interval, and the signal transmission RTT, wherein the terminal device is capable of receiving a PDCCH in a second TCI state till the sixth slot, and the second TCI state is activated before the first TCI state.

Optionally, in some implementations, the fifth slot $S_5$ is determined according to a formula:

$$S_5=n+k1+\max\{X+T0k*(T_{first-SSB}+T_{SSB-proc}),K_{offset}\},$$

wherein n represents a slot in which the MAC CE is received, k1 represents the feedback delay of the PDSCH, X represents the first parameter, T0k represents the second parameter, $T_{first-SSB}$ represents the first time interval, $T_{SSB-proc}$ represents the duration for the terminal device to process the SSB, and $K_{offset}$ represents the signal transmission RTT.

Optionally, in some implementations, the sixth slot $S_6$ is determined according to a formula:

$$S_6=n+k1+\max\{X+T0k*T_{first-SSB},K_{offset}\}$$

wherein n represents a slot in which the MAC CE is received, k1 represents the feedback delay of the PDSCH, X represents the first parameter, T0k represents the second parameter, $T_{first-SSB}$ represents the first time interval, and $K_{offset}$ represents the signal transmission RTT.

Optionally, in some implementations, the first TCI state is known.

Optionally, in some implementations, the processing unit 420 is specifically configured to determine a seventh slot according to the feedback delay of the PDSCH, the first parameter, the first duration, the third parameter, the first time interval, the duration for the terminal device to process the SSB, and the signal transmission RTT, wherein the activation effective time of the first ICI state is not later than the seventh slot, and/or determine an eighth slot according to the feedback delay of the PDSCH, the first parameter, the first duration, the third parameter, the first time interval, and the signal transmission RTT, wherein the terminal device is capable of receiving a PDCCH in a second TCL state till the eighth slot, and the second TCI state is activated before the first TCI state.

Optionally, in some implementations, the seventh slot $S_7$ is determined according to a formula:

$$S_7=n+k1+\max\{X+T_{L1-RSRP}+T0uk*(T_{first-SSB}+T_{SSB-proc}),K_{offset}\},$$

wherein n represents a slot in which the MAC CE is received, k1 represents the feedback delay of the PDSCH, X represents the first parameter, $T_{L1-RSRP}$ represents the first duration, T0uk represents the third parameter, $T_{first-SSB}$ represents the first time interval, $T_{SSB-proc}$ represents the duration for the terminal device to process the SSB, and $K_{offset}$ represents the signal transmission IT.

Optionally, in some implementations, the eighth slot $S_8$ is determined according to a formula:

$$S_8=n+k1+\max\{X+T_{L1-RSRP}+T0uk*T_{first-SSB},K_{offset}\},$$

wherein n represents a slot in which the MAC CE is received, k1 represents the feedback delay of the PDSCH, X represents the first parameter, $T_{L1-RSRP}$ represents the first time length, T0uk represents the third parameter, $T_{first-SSB}$ represents the first time interval, and $K_{offset}$ represents the signal transmission RTT.

Optionally, in some implementations, the signal transmission RTT is determined according to a TA for the terminal device, determined according an RTT between the terminal device and the terminal device, configured by a network device, or a predefined value.

Optionally, in some implementations, the processing unit is specifically configured to determine the effective time of the first downlink configuration and/or the effective time of the MAC CE according to the signal transmission RTT on condition that a HARQ feedback function of a first HARQ process is enabled, wherein the first HARQ process is used for transmitting a PDSCH carrying the MAC CE.

Optionally, in some implementations, the communication unit may be a communication interface or a transceiver, or an input/output interface of a communication chip or system-on-chip. The processing unit may be one or more processors.

It should be understood that the terminal device 400 according to implementations of the disclosure may correspond to the terminal device in the method implementations of the disclosure, and the above-mentioned and other operations and/or functions of each unit in the terminal device 400 are to realize the corresponding processes performed by the terminal device in the method 200 illustrated in FIG. 5 to FIG. 10, which will not be repeated herein for brevity.

Figure 14:
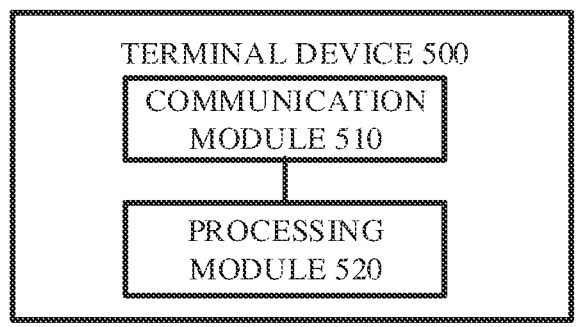
FIG. 14 is a schematic block diagram of a terminal device provided in implementations of the disclosure.

FIG. 14 is a schematic block diagram of a terminal device according to implementations of the disclosure. The terminal device 500 in FIG. 14 includes a communication unit 510 and a processing unit 520.

The communication unit 510 is configured to receive an RRC message transmitted from a network device.

The processing unit 520 is configured to determine an RRC procedure processing delay corresponding to the RRC message according a signal transmission RTT between the terminal device and the network device.

Optionally, in some implementations, the processing unit 520 is further configured to determine the RRC procedure processing delay corresponding to the RRC message according to the signal transmission RTT, a processing delay of the RRC message, and a feedback delay of a PDSCH carrying the RRC message.

Optionally, in some implementations, the RRC procedure processing delay $T_{delta}$ corresponding to the RRC message is determined according to a formula:

$$T_{delta} = \max\{T_{processing\ delay}, k1 + K_{offset}\},$$

where $T_{processing\ delay}$ represents the processing delay of the RRC message, k1 represents the feedback delay of the PDSCH, and $K_{offset}$ represents the signal transmission RET.

Optionally, in some implementations, the signal transmission RTT is determined according to a timing advance (TA) for the terminal device, determined according an RTT between the terminal device and the terminal device, configured by a network device, or a predefined value.

Optionally, in some implementations, the processing unit 520 is further configured to determine the RRC procedure processing delay corresponding to the RRC message according to the signal transmission RTT on condition that a HARQ feedback function of a first HARQ process is enabled, where the first HARQ process is used for transmitting a PDSCH carrying the RRC message.

Optionally, in some implementations, the communication unit may be a communication interface or a transceiver, or an input/output interface of a communication chip or system-on-chip. The processing unit may be one or more processors.

It should be understood that the terminal device 500 according to implementations of the disclosure may correspond to the terminal device in the method implementations of the disclosure, and the above-mentioned and other operations and/or functions of each unit in the terminal device 400 are to realize the corresponding processes performed by the terminal device in the method 300 illustrated in FIG. 11, which will not be repeated herein for brevity.

It should be understood that, the network device 500 according to implementations of the disclosure may correspond to the network device in the method implementations of the disclosure, and the above and other operations and/or functions of various units of the network device 500 are respectively intended for implementing corresponding procedures performed by the network device in the method 300 illustrated in FIG. 3, which will not be repeated herein for the sake of simplicity.

Figure 15:
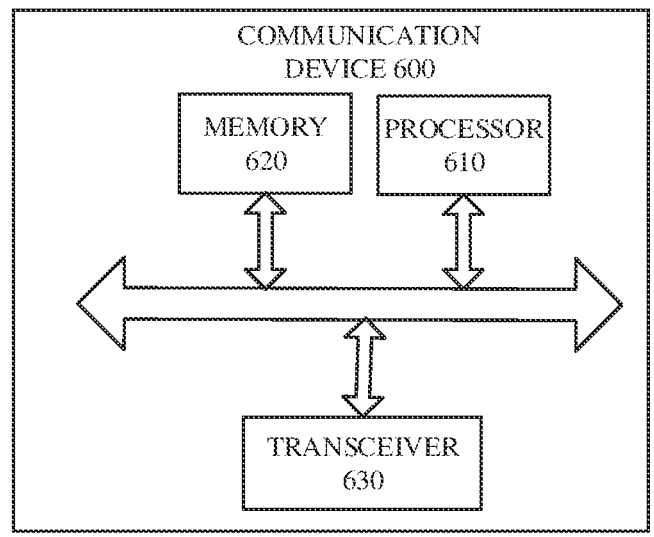
FIG. 15 is a schematic block diagram of a communication device provided in other implementations of the disclosure.

FIG. 15 is a schematic structural diagram of a communication device 600 provided in implementations of the disclosure. The communication device 600 illustrated in FIG. 15 includes a processor 610. The processor 610 can invoke and execute a computer program stored in a memory to perform the method in implementations of the disclosure.

Optionally, as illustrated in FIG. 15, the communication device 600 may further include the memory 620. The processor 610 can invoke and execute the computer program stored in the memory 620 to perform the method in implementations of the disclosure.

The memory 620 may be a separate device independent of the processor 610, or may be integrated into the processor 610.

Optionally, as illustrated in FIG. 15, the communication device 600 may further include a transceiver 630. The processor 610 can control the transceiver 630 to communicate with other devices, specifically, to transmit information or data to other devices or to receive information or data transmitted by other devices.

The transceiver 630 may include a transmitter and a receiver. The transceiver 630 may further include an antenna, where one or more antennas can be provided.

Optionally, the communication device 600 may be operable as the network device in implementations of the disclosure, and the communication device 600 can implement the operations performed by the network device in various methods in implementations of the disclosure, which will not be repeated herein for the sake of simplicity.

Optionally, the communication device 600 may be operable as the mobile terminal/the terminal device in implementations of the disclosure, and the communication device 600 can implement the operations performed by the mobile terminal/the terminal device in various methods in implementations of the disclosure, which will not be repeated herein for the sake of simplicity.

Figure 16:
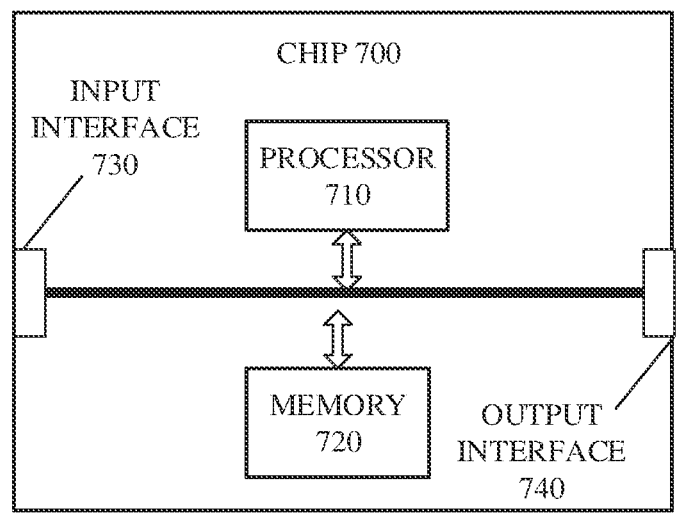
FIG. 16 is a schematic block diagram of a chip provided in implementations of the disclosure.

FIG. 16 is a schematic structural diagram of a chip provided in implementations of the disclosure. As illustrated in FIG. 16, the chip 700 includes a processor 710. The processor 710 can invoke and execute a computer program stored in a memory to perform the method in implementations of the disclosure.

Optionally, as illustrated in FIG. 16, the chip 700 further includes the memory 720. The processor 710 can invoke and execute the computer program stored in the memory 720 to perform the method in implementations of the disclosure.

The memory 720 may be a separate device independent of the processor 710, or may be integrated into the processor 710.

Optionally, the chip 700 may further include an input interface 730. The processor 710 can control the input interface 730 to communicate with other devices or chips, specifically, to obtain information or data transmitted by other devices or chips.

Optionally, the chip 700 may further include an output interface 740. The processor 710 can control the output interface 740 to communicate with other devices or chips, specifically, to output information or data to other devices or chips.

Optionally, the chip is applicable to the network device in implementations of the disclosure. The chip can implement the operations performed by the network device in various methods in implementations of the disclosure, which will not be repeated herein for the sake of simplicity.

Optionally, the chip is applicable to the mobile terminal/the terminal device in implementations of the disclosure. The chip can implement the operations performed by the mobile terminal/the terminal device in various methods in implementations of the disclosure, which will not be repeated herein for the sake of simplicity.

It should be understood that, the chip in implementations of the disclosure may also be referred to as a system-on-chip (SOC).

It should be understood that, the processor in implementations of the disclosure may be an integrated circuit chip with signal processing capabilities. During implementation, each operation of the foregoing method implementations may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, operations, and logic blocks disclosed in implementations of the disclosure can be implemented or executed. The general-purpose processor may be a microprocessor, or the processor may be any conventional processor or the like. The operations of the method disclosed in implementations of the disclosure may be directly implemented by a hardware decoding processor, or may be performed by hardware and software modules in the decoding processor. The software module may be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the operations of the method described above with the hardware thereof.

It can be understood that, the memory in implementations of the disclosure may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory may be a RAM that acts as an external cache. By way of example rather than limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It should be noted that, the memory of the systems and methods described in the disclosure is intended to include, but is not limited to, these and any other suitable types of memory.

It should be understood that, the memory above is intended for illustration rather than limitation. For example, the memory in implementations of the disclosure may also be an SRAM, a DRAM, an SDRAM, a DDR SDRAM, an ESDRAM, a SLDRAM, a DR RAM, etc. In other words, the memory in implementations of the disclosure is intended to include, but is not limited to, these and any other suitable types of memory.

A computer-readable storage medium is further provided in implementations of the disclosure. The computer-readable storage medium is configured to store a computer program.

Optionally, the computer-readable storage medium is applicable to the network device in implementations of the disclosure. The computer program causes a computer to implement the operations performed by the network device in various methods in implementations of the disclosure, which will not be repeated herein for the sake of simplicity.

Optionally, the computer-readable storage medium is applicable to the mobile terminal/the terminal device in implementations of the disclosure. The computer program causes a computer to implement the operations performed by the mobile terminal/the terminal device in various methods in implementations of the disclosure, which will not be repeated herein for the sake of simplicity.

A computer program product is further provided in implementations of the disclosure. The computer program product includes computer program instructions.

Optionally, the computer program product is applicable to the network device in implementations of the disclosure. The computer program instructions cause a computer to implement the operations performed by the network device in various methods in implementations of the disclosure, which will not be repeated herein for the sake of simplicity.

Optionally, the computer program product is applicable to the mobile terminal/the terminal device in implementations of the disclosure. The computer program instructions cause a computer to implement the operations performed by the mobile terminal/the terminal device in various methods in implementations of the disclosure, which will not be repeated herein for the sake of simplicity.

A computer program is further provided in implementations of the disclosure.

Optionally, the computer program is applicable to the network device in implementations of the disclosure. The computer program, when executed by a computer, causes the computer to implement the operations performed by the network device in various methods in implementations of the disclosure, which will not be repeated herein for the sake of simplicity.

Optionally, the computer program is applicable to the mobile terminal/the terminal device in implementations of the disclosure. The computer program, when executed by a computer, cause the computer to implement the operations performed by the mobile terminal/the terminal device in various methods in implementations of the disclosure, which will not be repeated herein for the sake of simplicity.

Those of ordinary skill in the art will appreciate that units and algorithmic operations of various examples described in connection with implementations of the disclosure can be implemented by electronic hardware or by a combination of computer software and electronic hardware. Whether these functions are performed by means of hardware or software depends on the particular application and the design constraints of the associated technical solutions. Those skilled in the art may use different methods with regard to each particular application to implement the described functionality, but such implementations should not be regarded as lying beyond the scope of the disclosure.

It will be evident to those skilled in the art that, for the sake of convenience and simplicity, in terms of the specific working processes of the foregoing systems, apparatuses, and units, reference can be made to the corresponding processes of the above method implementations, which will not be repeated herein.

It will be appreciated that the systems, apparatuses, and methods disclosed in implementations of the disclosure may also be implemented in various other manners. For example, the above apparatus implementations are merely illustrative, e.g., the division of units is only a division of logical functions, and there may be other manners of division available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, devices, or units, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

In addition, various functional units in various implementations of the disclosure may be integrated into one processing unit or may be present as the number of physically separated units, and two or more units may be integrated into one.

If the functions are implemented as software functional units and sold or used as standalone products, they may be stored in a computer-readable storage medium. Based on such an understanding, the essential technical solutions, or the portion that contributes to the prior art, or part of the technical solutions of the disclosure may be embodied as software products. The computer software products can be stored in a storage medium and may include multiple instructions that can cause a computing device, e.g., a personal computer, a server, a network device, etc., to execute some or all operations of the methods described in various implementations of the disclosure. The above storage medium may include various kinds of media that can store program codes, such as a universal serial bus (USB) flash disk, a mobile hard drive, a ROM, a RAM, a magnetic disk, or an optical disk.

The above are some specific implementations of the disclosure, but the protection scope of the disclosure is not limited thereto. Any changes or substitutions that can be easily conceived by those skilled in the art within the technical scope disclosed by the disclosure should be covered by the protection scope of the disclosure. Therefore, the protection scope of the disclosure should be subject to the protection scope of the claims.

What is claimed is:

1. A wireless communication method, comprising:
    receiving, by a terminal device, a media access control (MAC) control element (CE) transmitted from a network device, the MAC CE indicating a first downlink configuration; and
    determining, by the terminal device, an effective time of the first downlink configuration and/or an effective time of the MAC CE according to a signal transmission round trip time (RTT) between the terminal device and the network device.

2. The method of claim 1, wherein the MAC CE indicates activating at least one secondary cell (SCell), and determining, by the network device, the effective time of the first downlink configuration and/or the effective time of the MAC CE according to the signal transmission RTT between the terminal device and the network device comprises:
    determining, by the terminal device, an activation effective time of the at least one SCell according to the signal transmission RTT and first information, wherein the first information comprises at least one of:
        a feedback delay of a physical downlink shared channel (PDSCH) carrying the MAC CE;
        a first parameter, wherein the first parameter is a preset value or a value determined according to capability of the terminal device;
        an activation delay of the at least one SCell; or
        a reporting delay of channel state information (CSI) of the at least one SCell.

3. The method of claim 2, wherein determining, by the terminal device, the activation effective time of the at least one SCell according to the signal transmission RTT and the first information comprises:
    determining, by the terminal device, a first slot according to the feedback delay of the PDSCH, the first parameter, and the signal transmission RTT, wherein the activation effective time of the at least one SCell is not earlier than the first slot; and/or
    determining, by the terminal device, a second slot according to the activation delay of the at least one SCell, the reporting delay of the CSI for the at least one SCell, and the signal transmission RTT, wherein the activation effective time of the at least one SCell is not later than the second slot.

4. The method of claim 3, wherein
the first slot $S_1$ is determined according to a formula:

$$S_1 = n + k1 + \max\{X * N_{slot}^{subframe,\mu}, K_{offset}\} + 1;$$

and
the second slot $S_2$ is determined according to a formula:

$$S_2 = n + k1 + \max\{T_{activation\_time} + T_{CSI\_reporting}, K_{offset}\},$$

wherein n represents a slot in which the MAC CE is received, k1 represents the feedback delay of the PDSCH, X represents the first parameter, $$N_{slot}^{subframe,\mu}$$

represents a number of slots contained in a subframe corresponding to a subcarrier spacing μ for transmitting feedback information for the PDSCH, $T_{activation\_time}$ represents the activation delay of the at least one SCell, $T_{CSI\_reporting}$ represents the reporting delay of the CSI for the at least one SCell, and $K_{offset}$ represents the signal transmission RTT.

5. The method of claim 1, wherein the MAC CE indicates deactivating at least one SCell, and determining, by the terminal device, the effective time of the first downlink configuration and/or the effective time of the MAC CE according to the signal transmission RTT between the terminal device and the network device comprises:
    determining, by the terminal device, a deactivation effective time of the at least one SCell according to the signal transmission RTT and second information, wherein the second information comprises at least one of:
        a feedback delay of a PDSCH carrying the MAC CE; or
        a first parameter, wherein the first parameter is a preset value or a value determined according to capability of the terminal device.

6. The method of claim 5, wherein determining, by the terminal device, the deactivation effective time of the at least one SCell according to the signal transmission RTT and the second information comprises:

determining, by the terminal device, a third slot according to the feedback delay of the PDSCH, the first parameter, and the signal transmission RTT, wherein the deactivation effective time of the at least one SCell is not later than the third slot, wherein the third slot $S_3$ is determined according to a formula:

$$S_3 = n + k1 + \max\{X * N_{slot}^{subframe,\mu}, K_{offset}\},$$

wherein n represents a slot in which the MAC CE is received, k1 represents the feedback delay of the PDSCH, X represents the first parameter, $N_{slot}^{subframe,\mu}$ represents a number of slots contained in a subframe corresponding to a subcarrier spacing µ for transmitting feedback information for the PDSCH, and $K_{offset}$ represents the signal transmission RTT.

7. The method of claim 1, wherein the MAC CE indicates activating a first transmission configuration indicator (TCI) state, and determining, by the terminal device, the effective time of the first downlink configuration and/or the effective time of the MAC CE according to the signal transmission RTT between the terminal device and the network device comprises:
determining, by the terminal device, the effective time of the MAC CE according to the signal transmission RTT and third information, wherein the third information comprises at least one of:
a feedback delay of a PDSCH carrying the MAC CE; or
a first parameter, wherein the first parameter is a preset value or a value determined according to capability of the terminal device.

8. The method of claim 7, wherein the effective time of the MAC CE is a fourth slot $S_4$, and the fourth slot $S_4$ is determined according to a formula:

$$S_4 = n + k1 + \max\{X * N_{slot}^{subframe,\mu}, K_{offset}\} + 1,$$

wherein n represents a slot in which the MAC CE is received, k1 represents the feedback delay of the PDSCH, X represents the first parameter, $N_{slot}^{subframe,\mu}$ represents a number of slots contained in a subframe corresponding to a subcarrier spacing µ for transmitting feedback information for the PDSCH, and $K_{offset}$ represents the signal transmission RTT.

9. The method of claim 1, wherein the MAC CE indicates activating a first TCI state, and determining, by the terminal device, the effective time of the first downlink configuration and/or the effective time of the MAC CE according to the signal transmission RTT between the terminal device and the network device comprises:
determining, by the terminal device, an activation effective time of the first TCI state according to the signal transmission RTT and fourth information, wherein the fourth information comprises at least one of:
whether the first TCI state is known;
a feedback delay of a PDSCH carrying the MAC CE;
a first parameter, wherein the first parameter is a preset value or a value determined according to capability of the terminal device;
a second parameter, wherein the second parameter has a value determined according to whether the first TCI state is in a list of activated TCI states of the terminal device;
a first time interval representing a time interval from when the terminal device obtains the MAC CE by decoding to a first transmission of a synchronous signal block (SSB);
a duration for the terminal device to process the SSB;
a first duration representing a time required for beam quality measurement, wherein the beam quality measurement is for receiving beam adjustment; or
a third parameter, wherein the third parameter has a value determined according to a reference signal used for the beam quality measurement.

10. The method of claim 9, wherein determining, by the terminal device, the activation effective time of the first TCI state according to the signal transmission RTT and the fourth information comprises:
determining, by the terminal device, a fifth slot according to the feedback delay of the PDSCH, the first parameter, the second parameter, the first time interval, the duration for the terminal device to process the SSB, and the signal transmission RTT, wherein the activation effective time of the first TCI state is not later than the fifth slot; and/or
determining, by the terminal device, a sixth slot according to the feedback delay of the PDSCH, the first parameter, the second parameter, the first time interval, and the signal transmission RTT, wherein the terminal device is capable of receiving a physical downlink control channel (PDCCH) in a second TCI state till the sixth slot, and the second TCI state is activated before the first TCI state.

11. The method of claim 10, wherein the fifth slot $S_5$ is determined according to a formula:

$S_5 = n+k1+\max\{X+T0K*(T_{first-SSB}+T_{SSB-proc}), K_{offset}\},$
and the sixth slot $S_6$ is determined according to a formula:

$S_6 = n+k1+\max\{X+T0k*T_{first-SSB}, K_{offset}\},$ wherein n represents a slot in which the MAC CE is received, k1 represents the feedback delay of the PDSCH, X represents the first parameter, T0k represents the second parameter, $T_{first-SSB}$ represents the first time interval, $T_{SSB-proc}$ represents the duration for the terminal device to process the SSB, and $K_{offset}$ represents the signal transmission RTT.

12. The method of claim 10, wherein the first TCI state is known.

13. The method of claim 9, wherein determining, by the terminal device, the activation effective time of the first TCI state according to the signal transmission RTT and the fourth information comprises:
determining, by the terminal device, a seventh slot according to the feedback delay of the PDSCH, the first parameter, the first duration, the third parameter, the first time interval, the duration for the terminal device to process the SSB, and the signal transmission RTT, wherein the activation effective time of the first TCI state is not later than the seventh slot; and/or determining, by the terminal device, an eighth slot according to the feedback delay of the PDSCH, the first parameter, the first duration, the third parameter, the first time interval, and the signal transmission RTT, wherein the terminal device is capable of receiving a PDCCH in a second TCI state till the eighth slot, and the second TCI state is activated before the first TCI state.

14. The method of claim 13, wherein the seventh slot $S_7$ is determined according to a formula:

$$S_7 = n + k1 + \max\{X + T_{L1\text{-}RSRP} + T0uk*(T_{first\text{-}SSB} + T_{SSB\text{-}proc}), K_{offset}\}, \text{ and}$$

the eighth slot $S_8$ is determined according to a formula:

$$S_8 = n + k1 + \max\{X + T_{L1\text{-}RSRP} + T0uk*T_{first\text{-}SSB}, K_{offset}\},$$

wherein n represents a slot in which the MAC CE is received, k1 represents the feedback delay of the PDSCH, X represents the first parameter, $T_{L1\text{-}RSRP}$ represents the first duration, T0uk represents the third parameter, $T_{first\text{-}SSB}$ represents the first time interval, $T_{SSB\text{-}proc}$ represents the duration for the terminal device to process the SSB, and $K_{offset}$ represents the signal transmission RTT.

15. The method of claim 1, wherein the signal transmission RTT is determined according to a timing advance (TA) for the terminal device, determined according an RTT between the terminal device and the terminal device, configured by a network device, or a predefined value.

16. The method of claim 1, wherein determining, by the terminal device, the effective time of the first downlink configuration and/or the effective time of the MAC CE according to the signal transmission RTT between the terminal device and the network device comprises:

determining, by the terminal device, the effective time of the first downlink configuration and/or the effective time of the MAC CE according to the signal transmission RTT on condition that a hybrid automatic repeat request (HARQ) feedback function of a first HARQ process is enabled, wherein the first HARQ process is used for transmitting a PDSCH carrying the MAC CE.

17. A method for wireless communication, comprising:

receiving, by a terminal device, a radio resource control (RRC) message transmitted from a network device; and determining, by the terminal device, an RRC procedure processing delay corresponding to the RRC message according to a signal transmission round trip time (RTT) between the terminal device and the network device, wherein determining, by the terminal device, the RRC procedure processing delay corresponding to the RRC message according to the signal transmission RTT between the terminal device and the network device comprises:

determining, by the terminal device, the RRC procedure processing delay corresponding to the RRC message, based on: the signal transmission RTT, a processing delay of the RRC message, and a feedback delay of a physical downlink shared channel (PDSCH) carrying the RRC message, wherein the RRC procedure processing delay corresponding to the RRC message, represented by $T_{delta}$, is determined according to a formula:

$$T_{delta} = \max\{T_{processing\ delay}, k1 + K_{offset}\},$$

wherein $T_{processing\ delay}$ represents the processing delay of the RRC message, k1 represents the feedback delay of the PDSCH, and $K_{offset}$ represents the signal transmission RTT.

18. A terminal device, comprising:

a processor; and a memory configured to store a computer program which, when execute by the processor, causes the processor to:

receive a media access control (MAC) control element (CE) transmitted from a network device, the MAC CE indicating a first downlink configuration; and determine an effective time of the first downlink configuration and/or an effective time of the MAC CE according to a signal transmission round trip time (RTT) between the terminal device and the network device.

* * * * *